United States Patent [19]

Berner

[11] 4,426,472

[45] * Jan. 17, 1984

[54] LIGHT STABILIZATION OF METALLIC LACQUERS

[75] Inventor: Godwin Berner, Basel, Switzerland

[73] Assignee: Ciba-Geigy Corporation, Ardsley, N.Y.

[*] Notice: The portion of the term of this patent subsequent to Aug. 17, 1999 has been disclaimed.

[21] Appl. No.: 375,416

[22] Filed: May 6, 1982

Related U.S. Application Data

[63] Continuation of Ser. No. 221,590, Dec. 31, 1980, abandoned, which is a continuation of Ser. No. 971,271, Dec. 20, 1978, abandoned.

[30] Foreign Application Priority Data

Dec. 30, 1977 [CH] Switzerland ..................... 16297/77
Apr. 28, 1978 [CH] Switzerland ..................... 4651/78

[51] Int. Cl.$^3$ .......................... C09D 3/28; C09D 3/81
[52] U.S. Cl. ...................................... 524/99; 106/176; 428/460; 524/100; 524/102; 524/103; 525/162
[58] Field of Search .......................... 524/99, 100, 102; 525/162

[56] References Cited

U.S. PATENT DOCUMENTS

| | | | |
|---|---|---|---|
| 3,468,973 | 9/1969 | Emmons et al. | 525/162 |
| 3,548,027 | 12/1970 | Hornung et al. | 525/162 |
| 3,657,384 | 4/1972 | Yoshida et al. | 525/162 |
| 3,832,217 | 8/1974 | Sato et al. | 525/162 |
| 3,845,023 | 10/1974 | Dalibor | 525/162 |
| 3,925,376 | 12/1975 | Chalmers et al. | 524/100 |
| 3,959,413 | 5/1976 | Schwarzenbach et al. | 260/937 |
| 4,102,943 | 7/1978 | Isaksen et al. | 525/162 |
| 4,105,626 | 8/1978 | Brunetti et al. | 524/99 |
| 4,110,304 | 8/1978 | Gilg et al. | 524/100 |
| 4,153,596 | 5/1979 | Oertel et al. | 524/99 |
| 4,344,876 | 8/1982 | Berner | 525/162 |

FOREIGN PATENT DOCUMENTS 52-22029 2/1977 Japan .
52-51427 4/1977 Japan .

*Primary Examiner*—John Kight, III
*Assistant Examiner*—R. A. White
*Attorney, Agent, or Firm*—Harry Falber

[57] ABSTRACT

Use of 2,2,6,6-tetraalkylpiperidine compounds or their acid addition salts or complexes with metal compounds, optionally together with further stabilizers, for stabilizing metallic stoving lacquers based on hot-crosslinkable alkyd or acrylic resins against the action of light, moisture and oxygen.

14 Claims, No Drawings

LIGHT STABILIZATION OF METALLIC LACQUERS

This is a continuation of application Ser. No. 221,590 filed on Dec. 31, 1980, now abandoned, which in turn is a continuation of application Ser. No. 971,271, filed Dec. 20, 1978, now abandoned.

The present invention relates to the stabilising of metallic stoving lacquers based on hot-crosslinkable alkyd resins or acrylic resins against the action of light and moisture by the addition of polyalkylpiperidine derivatives, and also to the metallic lacquers stabilised in this manner.

It has been found that the problems repeatedly occurring in the case of metallic lacquering, especially with regard to cracking and loss of lustre, with use of stoving lacquers based on hot-crosslinkable alkyd resins or acrylic resins can be satisfactorily solved by the addition of light stabilisers based on polyalkylpiperidine derivatives, optionally together with further stabilisers.

The present invention relates therefore to the use of 2,2,6,6-tetraalkylpiperidine compounds, of their acid addition salts or complexes with metal compounds, optionally together with further stabilisers, for stabilising metallic stoving lacquers based on hot-crosslinkable alkyd resins or acrylic resins against the action of light, moisture and oxygen.

The 2,2,6,6-tetraalkylpiperidine compounds to be used according to the invention are generally known, and are already being used to combat light degradation. They are for example compounds which contain a group of the formula (I)

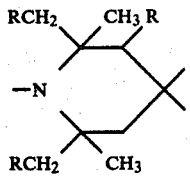

in which R is hydrogen or methyl.

The light stabilisers to be used according to the invention include in particular the following classes of compounds:

(a) Light stabilisers of the formula (II)

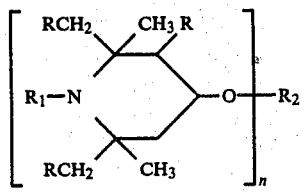

in which n is a number from 1–4 inclusive, preferably 1 or 2; R is as defined under the formula (I); $R_1$ is hydrogen, oxyl, $C_1$–$C_{18}$ alkyl, $C_3$–$C_8$ alkenyl, $C_3$–$C_8$ alkynyl, $C_7$–$C_{12}$ aralkyl, $C_1$–$C_8$ alkanoyl, $C_3$–$C_5$ alkenoyl, glycidyl, a group —$CH_2CH(OH)$—Z wherein Z is hydrogen, methyl or phenyl, with $R_1$ preferably being hydrogen, $C_1$–$C_{12}$ alkyl, allyl, benzyl, acetyl or acryloyl; and $R_2$ when n is 1 is hydrogen, $C_1$–$C_{18}$ alkyl optionally interrupted by one or more oxygen atoms, cyanoethyl, benzyl, glycidyl, a monovalent radical of an aliphatic, cycloaliphatic, araliphatic or aromatic carboxylic acid, or of carbamic acid or of a phosphorus-containing acid, or a monovalent silyl radical, preferably a radical of an aliphatic carboxylic acid having 2–18 C atoms, of a cycloaliphatic carboxylic acid having 5–12 C atoms or of an aromatic carboxylic acid having 7–15 C atoms; $R_2$ when n is 2 is $C_1$–$C_{12}$ alkylene, $C_4$–$C_{12}$ alkenylene, xylylene, a bivalent radical of an aliphatic, cycloaliphatic, araliphatic or aromatic dicarboxylic acid, of dicarbamic acid or of a phosphorus-containing acid, or a bivalent silyl radical, preferably a radical of an aliphatic dicarboxylic acid having 2–36 C atoms, of a cycloaliphatic or aromatic dicarboxylic acid having 8–14 C atoms, or of an aliphatic, cycloaliphatic or aromatic dicarbamic acid having 8–14 C atoms; $R_2$ when n is 3 is a trivalent radical of an aliphatic, cycloaliphatic or aromatic tricarboxylic acid, of an aromatic tricarbamic acid or of a phosphorus-containing acid, or a trivalent silyl radical; and $R_2$ when n is 4 is a tetravalent radical of an aliphatic, cycloaliphatic or aromatic tetracarboxylic acid.

If any substituents are $C_1$–$C_{12}$ alkyl, they are for example methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

As $C_1$–$C_{18}$ alkyl, $R_1$ or $R_2$ can be for example the groups given above, and in addition for example n-tridecyl, n-tetradecyl, n-hexadecyl or n-octadecyl.

When $R_1$ is $C_3$–$C_8$ alkenyl, it can be for example 1-propenyl, allyl, methallyl, 2-butenyl, 2-pentenyl, 2-hexenyl, 2-octenyl or 4-tert-butyl-2-butenyl.

As $C_3$–$C_8$ alkynyl, $R_1$ is preferably propargyl.

$R_1$ as $C_7$–$C_{12}$ aralkyl is in particular phenethyl or especially benzyl.

As $C_1$–$C_8$ alkanoyl, $R_1$ is for example formyl, propionyl, butyryl, octanoyl but preferably acetyl, and as $C_3$–$C_5$ alkenoyl, $R_1$ is particularly acryloyl.

If $R_2$ is a monovalent radical of a carboxylic acid, it is for example a radical of acetic acid, stearic acid, salicylic acid, methacrylic acid, maleic acid, benzoic acid or $\beta$-(3,5-di-tert-butyl-4-hydroxyphenyl)-propionic acid.

If $R_2$ is a bivalent radical of a dicarboxylic acid, it is for example a radical of adipic acid, suberic acid, sebacic acid, phthalic acid, dibutylmalonic acid, dibenzylmalonic acid or butyl-(3,5-di-tert-butyl-4-hydroxybenzyl)malonic acid, or bicycloheptenedicarboxylic acid.

If $R_2$ is a trivalent radical of a tricarboxylic acid, it is for example a radical of trimellitic acid or of nitrilotriacetic acid.

If $R_2$ is a tetravalent radical of a tetracarboxylic acid, it is for example a radical of pyromellitic acid.

If $R_2$ is a bivalent radical of a dicarbamic acid, it is for example a radical of hexamethylenedicarbamic acid or of 2,4-toluylenedicarbamic acid.

The following compounds are examples of polyalkylpiperidine light stabilisers of this class:

(1) 4-hydroxy-2,2,6,6-tetramethylpiperidine,
(2) 1-allyl-4-hydroxy-2,2,6,6-tetramethylpiperidine,
(3) 1-benzyl-4-hydroxy-2,2,6,6-tetramethylpiperidine,
(4) 1-(4-tert-butyl-2-butenyl)-4-hydroxy-2,2,6,6-tetramethylpiperidine,
(5) 4-stearoyloxy-2,2,6,6-tetramethylpiperidine,
(6) 1-ethyl-4-salicyloyloxy-2,2,6,6-tetramethylpiperidine,
(7) 4-methacryloyloxy-1,2,2,6,6-pentamethylpiperidine,
(8) 1,2,2,6,6-pentamethylpiperidin-4-yl-$\beta$-(3,5-di-tert-butyl-4-hydroxyphenyl)-propionate,
(9) 1-benzyl-2,2,6,6-tetramethyl-4-piperidinylmaleinate,
(10) (di-2,2,6,6-tetramethylpiperidin-4-yl)-adipate

(11) (di-2,2,6,6-tetramethylpiperidin-4-yl)-sebacate,
(12) (di-1,2,3,6-tetramethyl-2,6-diethyl-piperidin-4-yl)-sebacate,
(13) (di-1-allyl-2,2,6,6-tetramethyl-piperidin-4-yl)-phthalate,
(14) 1-propargyl-4-β-cyanoethyloxy-2,2,6,6-tetramethylpiperidine,
(15) 1-acetyl-2,2,6,6-tetramethylpiperidin-4-yl-acetate,
(16) trimellitic acid-tri-(2,2,6,6-tetramethylpiperidin-4-yl) ester,
(17) 1-acryloyl-4-benzyloxy-2,2,6,6-tetramethylpiperidine,
(18) dibutyl-malonic acid-di-(1,2,2,6,6-pentamethyl-piperidin-4-yl) ester,
(19) butyl-(3,5-di-tert-butyl-4-hydroxybenzyl)-malonic acid-di-(1,2,2,6,6-pentamethylpiperidin-4-yl) ester,
(20) dibenzyl-malonic acid-di-(1,2,2,6,6-pentamethyl-piperidin-4-yl) ester,
(21) dibenzyl-malonic acid-di-(1,2,3,6-tetramethyl-2,6-diethyl-piperidin-4-yl) ester,
(22) hexane-1',6'-bis-(4-carbamoyloxy-1-n-butyl-2,2,6,6-tetramethylpiperidine),
(23) toluene-2',4'-bis-(4-carbamoyloxy-1-n-propyl-2,2,6,6-tetramethylpiperidine),
(24) dimethyl-bis-(2,2,6,6-tetramethylpiperidine-4-oxy)-silane,
(25) phenyl-tris-(2,2,6,6-tetramethylpiperidine-4-oxy)silane,
(26) tris-(1-propyl-2,2,6,6-tetramethylpiperidin-4-yl)-phosphite,
(27) tris-(1-propyl-2,2,6,6-tetramethylpiperidin-4-yl)-phosphate, and
(28) phenyl-[bis-(1,2,2,6,6-pentamethylpiperidin-4-yl)]-phosphonate.

(b) Light stabilisers of the formula (III)

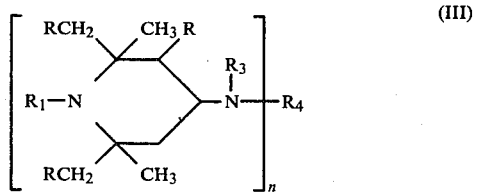

(III)

in which n is the number 1 or 2; R is as defined under the formula I; $R_1$ is as defined under (a); $R_3$ is hydrogen, $C_1$–$C_{12}$ alkyl, $C_5$–$C_7$ cycloalkyl, $C_7$–$C_8$ aralkyl, $C_2$–$C_{18}$ alkanoyl, $C_3$–$C_5$ alkenoyl or benzoyl; and $R_4$ when n is 1 is hydrogen, $C_1$–$C_{18}$ alkyl, $C_5$–$C_7$ cycloalkyl, $C_2$–$C_8$ alkenyl unsubstituted or substituted by a cyano, carbonyl or carbamide group, or it is glycidyl, a group of the formula —$CH_2$—CH(OH)—Z or of the formula —CONH—Z wherein Z is hydrogen, methyl or phenyl; or $R_4$ when n is 2 is $C_2$–$C_{12}$ alkylene, $C_6$–$C_{12}$ arylene, xylilene, a —$CH_2$—CH(OH)—$CH_2$ group, or a group —$CH_2$—CH(OH)—$CH_2$—O—X—O—$CH_2$—CH(OH)—$CH_2$— wherein X is $C_2$–$C_{10}$ alkylene, $C_6$–$C_{15}$ arylene or $C_6$–$C_{12}$ cycloalkylene; or, provided that $R_3$ is not alkanoyl, alkenoyl or benzoyl, $R_4$ can also be a bivalent radical of an aliphatic, cycloaliphatic or aromatic dicarboxylic acid or dicarbamic acid, or can be the group —CO— or $R_3$ and $R_4$ together when n is 1 can be the cyclic radical of an aliphatic or aromatic 1,2- or 1,3-dicarboxylic acid.

If any substituents are $C_1$–$C_{18}$ alkyl, they are as already defined under (a).

If any substituents are $C_5$–$C_7$ cycloalkyl, they are in particular cyclohexane.

As $C_7$–$C_8$ aralkyl, $R_3$ is particularly phenethyl or above all benzyl.

As $C_2$–$C_{18}$ alkanoyl, $R_3$ is for example propionyl, butyryl, octanoyl, dodecanoyl, hexadecanoyl, octadecanoyl but preferably acetyl; and as $C_3$–$C_5$ alkenoyl, $R_3$ is in particular acryloyl.

If $R_4$ is $C_2$–$C_8$ alkenyl unsubstituted or substituted by a cyano, carbonyl or carbamide group, it is for example 1-propenyl, allyl, methallyl, 2-butenyl, 2-pentenyl, 2-hexenyl, 2-octenyl, 2,2-dicyanovinyl, 1-methyl-2-cyano-2-methoxycarbonyl-vinyl or 2,2-diacetylaminovinyl.

If any substituents are $C_2$–$C_{12}$ alkylene, they are for example ethylene, propylene, 2,2-dimethylpropylene, tetramethylene, hexamethylene, octamethylene, decamethylene or dodecamethylene.

If any substituents are $C_6$–$C_{15}$ arylene, they are for example o-, m- or p-phenylene, 1,4-naphthylene or 4,4'-diphenylene.

As $C_6$–$C_{12}$ cycloalkylene, X is especially cyclohexylene.

The following compounds are examples of polyalkylpiperidine light stabilisers of this class:
(29) N,N'-bis-(2,2,6,6-tetramethylpiperidin-4-yl)-hexamethylene-1,6-diamine,
(30) N,N'-bis-(2,2,6,6-tetramethylpiperidin-4-yl)-hexamethylene-1,6-diacetamide,
(31) 1-acetyl-4-(N-cyclohexylacetamido)-2,2,6,6-tetramethylpiperidine,
(32) 4-benzylamino-2,2,6,6-tetramethylpiperidine,
(33) N,N'-bis-(2,2,6,6-tetramethylpiperidin-4-yl)-N,N'-dibutyl-adipamide,
(34) N,N'-bis-(2,2,6,6-tetramethylpiperidin-4-yl)-N,N'-dicyclohexyl-(2-hydroxypropylene),
(35) N,N'-bis-(2,2,6,6-tetramethylpiperidin-4-yl)-p-xylylene-diamine,
(36) the compound of the formula

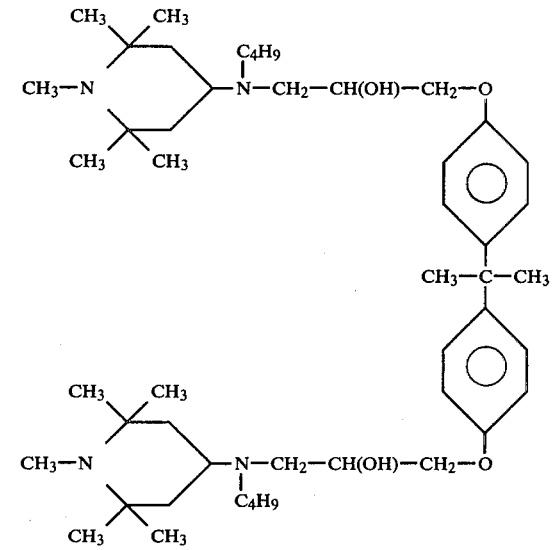

(37) 4-(bis-2-hydroxyethyl)-amino-1,2,2,6,6-pentamethylpiperidine,
(38) 4-(3-methyl-4-hydroxy-5-tert-butyl-benzoic acid-amido)-2,2,6,6-tetramethylpiperidine,

(39) 4-methacrylamido-1,2,2,6,6-pentamethylpiperidine, and

(40) α-cyano-β-methyl-β-[N-(2,2,6,6-tetramethylpiperidin-4-yl)]-amino-acrylic acid methyl ester.

(c) Light stabilisers of the formula (IV)

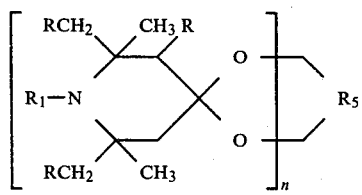

in which n is the number 1 or 2; R is as defined under the formula (I); $R_1$ is as defined under (a); and $R_5$ when n is 1 is $C_2$-$C_8$ alkylene or hydroxyalkylene or $C_4$-$C_{22}$ acyloxyalkylene; and $R_5$ when n is 2 is the group $(-CH_2)_2C(CH_2-)_2$.

If $R_5$ is $C_2$-$C_8$ alkylene or hydroxyalkylene, it is for example ethylene, 1-methyl-ethylene, propylene, 2-ethylpropylene or 2-ethyl-2-hydroxymethylpropylene.

As $C_4$-$C_{22}$ acyloxyalkylene, $R_5$ is for example 2-ethyl-2-acetoxymethyl-propylene.

The following compounds are examples of polyalkylpiperidine light stabilisers of this class:

(41) 9-aza-8,8,10,10-tetramethyl-1,5-dioxaspiro-[5.5]undecane,

(42) 9-aza-8,8,10,10-tetramethyl-3-ethyl-1,5-dioxaspiro[5.5]decane,

(43) 8-aza-2,7,7,8,9,9-hexamethyl-1,4-dioxyspiro[4.5]decane,

(44) 9-aza-3-hydroxymethyl-3-ethyl-8,8,9,10,10-pentamethyl-1,5-dioxaspiro[5.5]undecane,

(45) 9-aza-3-ethyl-3-acetoxymethyl-9-acetyl-8,8,10,10-tetramethyl-1,5-dioxaspiro[5.5]undecane, and

(46) 2,2,6,6-tetramethylpiperidine-4-spiro-2'-(1',3'-dioxane)-5'-spiro-5''-(1'',3''-dioxane)-2''-spiro-4'''. (2''', 2'''', 6''', 6''''-tetramethylpiperidine).

(d) Light stabilisers of the formula (V)

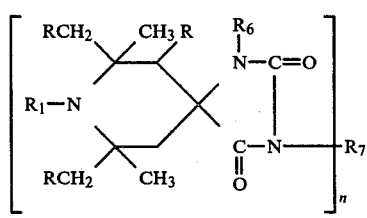

in which n is the number 1 or 2; R is as defined under the formula (I); $R_1$ is as defined under (a); $R_6$ is hydrogen, $C_1$-$C_{12}$ alkyl, allyl, benzyl, glycidyl or $C_2$-$C_6$ alkoxyalkyl; and $R_7$ when n is 1 is hydrogen, $C_1$-$C_{12}$ alkyl, $C_3$-$C_5$ alkenyl, $C_7$-$C_9$ aralkyl, $C_5$-$C_7$ cycloalkyl, $C_2$-$C_4$ hydroxyalkyl, $C_2$-$C_6$ alkoxyalkyl, $C_6$-$C_{10}$ aryl, glycidyl, a group of the formula $-(CH)-COO-Q$ or of the formula $-(CH_2)_m-O-CO-Q$ wherein m is 1 or 2, and Q is $C_1$-$C_4$ alkyl or phenyl; or $R_7$ when n is 2 is $C_2$-$C_{12}$ alkylene, $C_6$-$C_{12}$ arylene, a group $-CH_2-CH(OH)-CH_2-O-X-O-CH_2-CH(OH)-CH_2-$ wherein X is $C_2$-$C_{10}$ alkylene, $C_6$-$C_{15}$ arylene or $C_6$-$C_{12}$ cycloalkylene, or a group $-CH_2CH(OZ')CH_2-(OCH_2-CH(OZ')CH_2)_2-$ wherein Z' is hydrogen, $C_1$-$C_{18}$ alkyl, allyl, benzyl, $C_2$-$C_{12}$ alkanoyl or benzoyl.

If any substituents are $C_1$-$C_{12}$ alkyl, they are for example methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

As $C_1$-$C_{18}$ alkyl, Z' can be for example the groups stated above, and in addition for example n-tridecyl, n-tetradecyl, n-hexadecyl or n-octadecyl.

If any substituents are $C_2$-$C_6$ alkoxyalkyl, they are for example methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

If $R_7$ is $C_3$-$C_5$ alkenyl, it is for example 1-propenyl, allyl, methallyl, 2-butenyl or 2-pentenyl.

As $C_7$-$C_9$ aralkyl, $R_7$ is in particular phenethyl or above all benzyl; and as $C_5$-$C_7$ cycloalkyl, $R_7$ is especially cyclohexyl.

If $R_7$ is $C_2$-$C_4$ hydroxyalkyl, it is for example 2-hydroxyethyl, 2-hydroxypropyl, 3-hydroxypropyl, 2-hydroxybutyl or 4-hydroxybutyl.

As $C_6$-$C_{10}$ aryl, $R_7$ is in particular phenyl, or α- or β-naphthyl which is unsubstituted or substituted by halogen or $C_1$-$C_4$ alkyl.

If $R_7$ is $C_2$-$C_{12}$ alkylene, it is for example ethylene, propylene, 2,2-dimethylpropylene, tetramethylene, hexamethylene, octamethylene, decamethylene or dodecamethylene.

If $R_7$ is $C_6$-$C_{12}$ arylene, it is for example o-, m- or p-phenylene, 1,4-naphthylene or 4,4'-diphenylene.

If Z' is $C_2$-$C_{12}$ alkanoyl, it is for example propionyl, butyryl, octanoyl, dodecanoyl or preferably acetyl.

As $C_2$-$C_{10}$ alkylene, $C_6$-$C_{15}$ arylene or $C_6$-$C_{12}$ cycloalkylene, X has the meaning given under (b).

The following compounds are examples of polyalkylpiperidine light stabilisers of this class:

(47) 3-benzyl-1,3,8-triaza-7,7,9,9-tetramethylspiro[4.5]decane-2,4-dione,

(48) 3-n-octyl-1,3,8-triaza-7,7,9,9-tetramethylspiro[4.5]decane-2,4-dione,

(49) 3-allyl-1,3,8-triaza-1,7,7,9,9-pentamethylspiro[4.5]decane-2,4-dione,

(50) 3-glycidyl-1,3,8-triaza-7,7,8,9,9-pentamethylspiro[4.5]decane-2,4-dione, or the compounds of the following formulae:

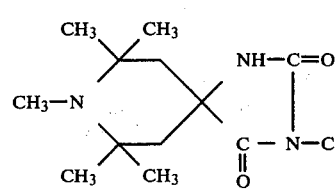 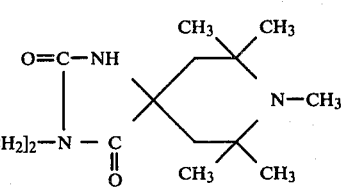

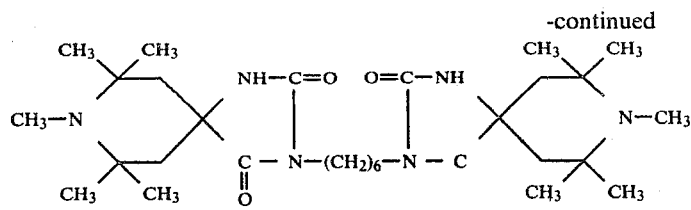

(52)

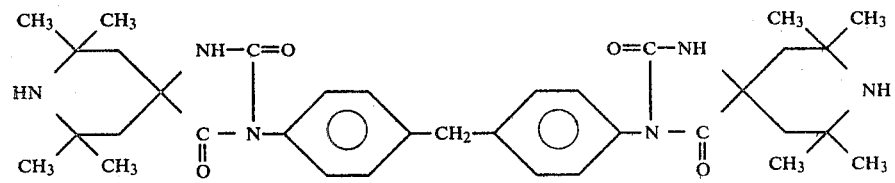

(53)

(e) Light stabilisers of the formula (VI)

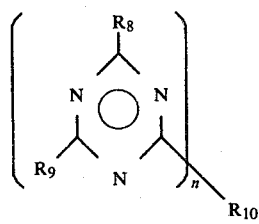

(VI)

in which n is the number 1 or 2, and $R_8$ is a group of the formula

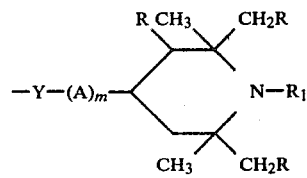

in which R is as defined under the formula (I), $R_1$ is as defined under (a), Y is —O— or —$NR_{11}$—, A is $C_2$–$C_6$ alkylene; and m is the number 0 or 1; $R_9$ is the groups $R_8$, $NR_{11}R_{22}$, —$OR_{13}$, —$NHCH_2OR_{13}$ or —$N(CH_2OR_{13})_2$; $R_{10}$ when n is 1 is the groups $R_8$ or $R_9$, and $R_{10}$ when n is 2 is the group —Y—Q—Y— wherein Q is $C_2$–$C_6$ alkylene optionally interrupted by —$N(R_{14})$—; $R_{11}$ is $C_1$–$C_{12}$ alkyl, cyclohexyl, benzyl or $C_1$–$C_4$ hydroxyalkyl, or a group of the formula

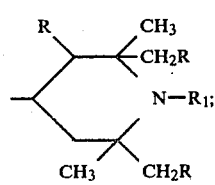

$R_{12}$ is $C_1$–$C_{12}$ alkyl, cyclohexyl, benzyl or $C_1$–$C_4$ hydroxyalkyl; $R_{13}$ is hydrogen, $C_1$–$C_{12}$ alkyl or phenyl; and $R_{14}$ is hydrogen or the group —$CH_2OR_{13}$; or $R_{11}$ and $R_{12}$ together are $C_4$–$C_5$ alkylene or oxaalkylene, or $R_{11}$ and $R_{12}$ are each a group of the formula If any substituents are $C_1$–$C_{12}$ alkyl, they are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

If any substituents are $C_1$–$C_4$ hydroxyalkyl, they are for example 2-hydroxyethyl, 2-hydroxypropyl, 3-hydroxypropyl, 2-hydroxybutyl or 4-hydroxybutyl.

If A is $C_2$–$C_6$ alkylene, it is for example ethylene, propylene, 2,2-dimethylpropylene, tetramethylene or hexamethylene.

If $R_{11}$ and $R_{12}$ together are $C_4$–$C_5$ alkylene or oxaalkylene, this is for example tetramethylene, pentamethylene or 3-oxapentamethylene.

The compounds of the following formulae are examples of polyalkylpiperidine light stabilisers of this class:

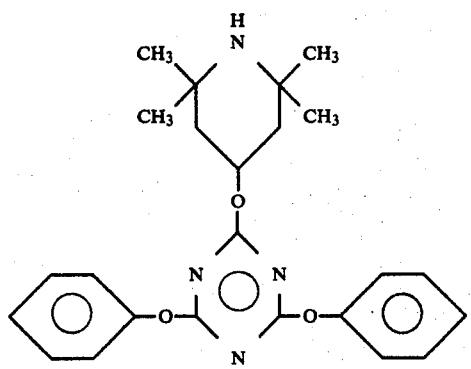
(54)
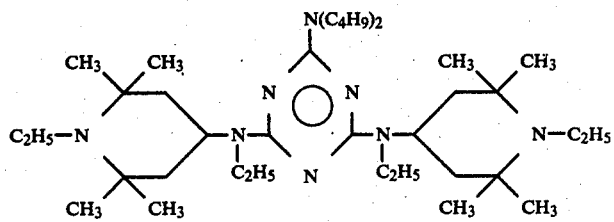
(55)
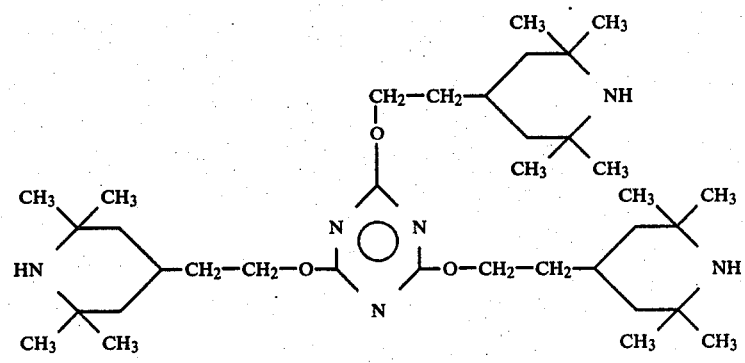
(56)
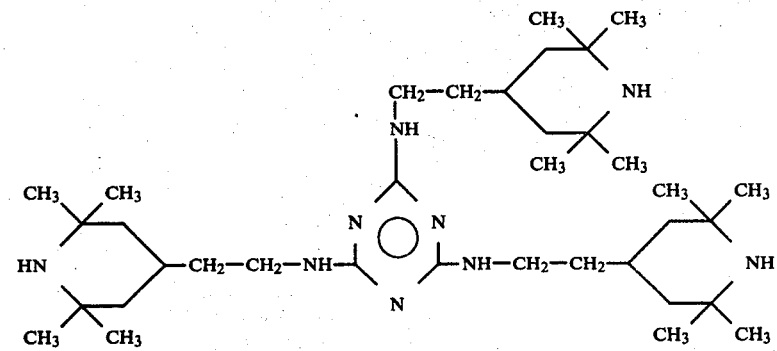
(57)

-continued

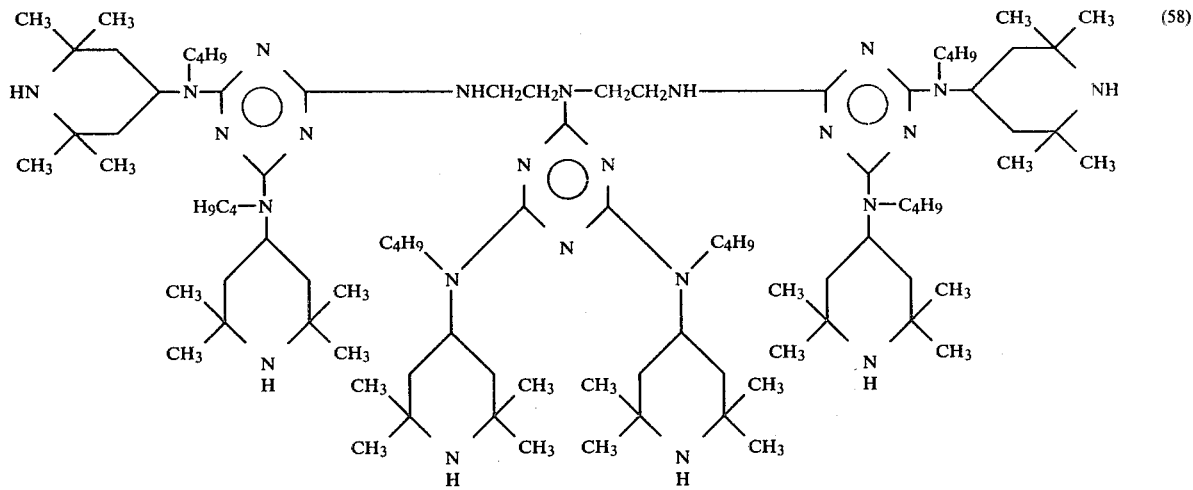

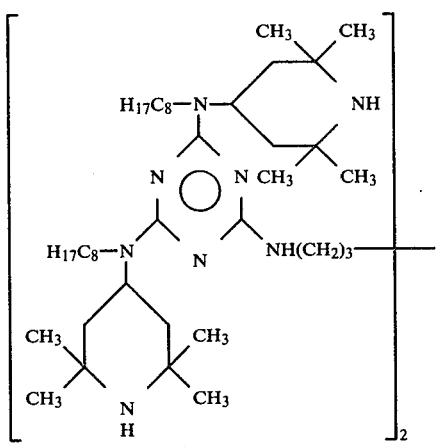

(f) Light stabilisers of the formula (VII)

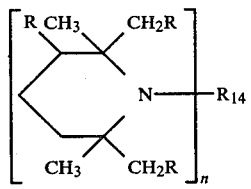

in which n is the number 1 or 2; R is as defined under the formula (I); and $R_{14}$ when n is 1 is $C_4$–$C_{18}$ alkyl, $C_7$–$C_{12}$ aralkyl, the group —CO—$R_{15}$, or $C_1$–$C_4$ alkyl which is substituted by —CN, —COOR$_{16}$, —OH, —OCOR$_{17}$ or

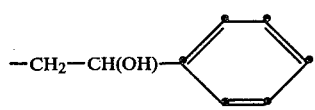

wherein $R_{15}$ is $C_1$–$C_{12}$ alkyl, $C_2$–$C_4$ akenyl or phenyl, $R_{16}$ is $C_1$–$C_{18}$ alkyl, $R_{17}$ is $C_1$–$C_{18}$ alkyl, $C_2$–$C_{10}$ alkenyl, cyclohexyl, benzyl or $C_6$–$C_{10}$ aryl; or $R_{14}$ when n is 2 is $C_4$–$C_{12}$ alkylene, 2-butenylene-1,4, xylylene, the group —(CH$_2$)$_2$—OOC—R$_{18}$—COO—(CH$_2$)$_2$ or the group —CH$_2$—OOC—R$_{19}$—COO—CH$_2$— wherein $R_{18}$ is $C_2$–$C_{10}$ alkylene, phenylene or cyclohexylene, and $R_{19}$ is $C_2$–$C_{10}$ alkylene, xylylene or cyclohexylene.

If any substituents are $C_1$–$C_{12}$ alkyl, they are for example methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

Any substituents which are $C_1$–$C_{18}$ alkyl can be for example the groups mentioned above, and in addition for example n-tridecyl, n-tetradecyl, n-hexadecyl or n-octadecyl.

If any groups are $C_2$–$C_{10}$ alkylene, these are in particular ethylene, propylene, 2,2-dimethylpropylene, tetramethylene, hexamethylene, octamethylene or decamethylene.

As $C_4$–$C_{18}$ alkyl, $R_{14}$ is for example n-butyl, sec-butyl, tert-butyl, n-hexyl, n-octyl, 2-ethyl-hexyl, 1,1-dimethyl-2-tert-butylethyl, n-nonyl, n-decyl, n-dodecyl, n-tridecyl, n-tetradecyl, n-hexadecyl or n-octadecyl.

If $R_{14}$ is a $C_1$–$C_4$ alkyl group substituted by —CN, it is for example cyanomethyl, cyanoethyl, 3-cyano-n-propyl or 4-cyano-n-butyl.

If $R_{14}$ is $C_4$–$C_{12}$ alkylene, it is for example 2,2-dimethylpropylene, tetramethylene, hexamethylene, octamethylene, decamethylene or dodecamethylene.

If $R_{14}$ is $C_7$–$C_{12}$ aralkyl, it is in particular phenethyl, p-methyl-benzyl or especially benzyl.

As $C_2$–$C_4$ alkenyl, $R_{15}$ is for example vinyl, 1-propenyl, allyl, methallyl or 2-butenyl.

As $C_2-C_{10}$ alkenyl, $R_{17}$ is for example the groups mentioned for $R_{15}$ as alkenyl, and in addition for example crotyl, 2-hexenyl, 2-octenyl or 2-decenyl.

If $R_{17}$ is $C_6-C_{10}$ aryl, it is for example phenyl which is unsubstituted or substituted in the o- or p-position by methyl, ethyl, isopropyl, n-butyl or tert-butyl.

The following compounds are examples of polyalkylpiperidine light stabilisers of this class:

(60) bis-[β-(2,2,6,6-tetramethylpiperidino)-ethyl]sebacate,

(61) α-(2,2,6,6-tetramethylpiperidino)-acetic acid-n-octyl ester, and

(62) 1,4-bis-(2,2,6,6-tetramethylpiperidino)-2-butene.

(g) Light stabilisers of the formula (VIII)

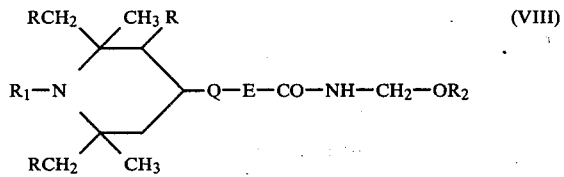
(VIII)

in which Q is $-N(R_3)-$ or $-O-$; E is $C_1-C_3$ alkylene, the group $-CH_2-CH(R_4)-O-$ wherein $R_4$ is hydrogen, methyl or phenyl, the group $-(CH_2)_3-NH-$ or a single bond; R is hydrogen or methyl; $R_1$ is hydrogen, $C_1-C_{18}$ alkyl, $C_3-C_8$ alkenyl, $C_3-C_8$ alkynyl, $C_7-C_{12}$ aralkyl, $C_1-C_8$ alkanoyl, $C_3-C_5$ alkenoyl or glycidyl; $R_2$ is hydrogen or $C_1-C_{18}$ alkyl; $R_3$ is hydrogen, $C_1-C_{18}$ alkyl, $C_5-C_7$ cycloalkyl, $C_7-C_{12}$ aralkyl, cyanoethyl, $C_6-C_{10}$ aryl, the group $-CH_2-CH(R_4)-OH$ wherein $R_4$ has the meaning defined above, a group of the formula

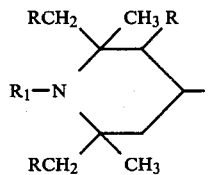

or a group of the formula

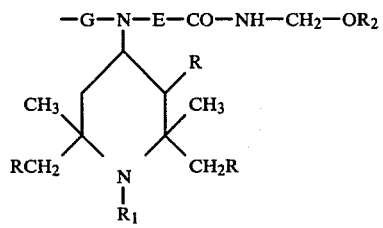

wherein G can be $C_2-C_6$ alkylene or $C_6-C_{12}$ arylene; or $R_3$ is a group $-E-CO-NH-CH_2-OR_2$.

If any substituents are $C_1-C_{18}$ alkyl, they are for example, methyl, ethyl, n-propyl, n-butyl, sec-butyl, tert-butyl, n-hexyl, n-octyl, 2-ethyl-hexyl, n-nonyl, n-decyl, n-undecyl, n-dodecyl, n-tridecyl, n-tetradecyl, n-hexadecyl or n-octadecyl.

If any substituents are $C_7-C_{12}$ aralkyl, they are for example phenethyl or in particular benzyl.

If $R_1$ is $C_3-C_8$ alkenyl, it can be for example 1-propenyl, allyl, methallyl, 2-butenyl, 2-pentenyl, 2-hexenyl, 2-octenyl or 4-tert-butyl-2-butenyl.

As $C_3-C_8$ alkynyl, $R_1$ is preferably propargyl. As $C_1-C_8$ alkanoyl, $R_1$ is for example formyl, propionyl, butyryl, octanoyl but preferably acetyl; and as $C_3-C_5$ alkenoyl, $R_1$ is especially acryloyl.

As $C_5-C_7$ cycloalkyl, $R_3$ is in particular cyclohexyl.

As $C_6-C_{10}$ aryl, $R_3$ is particularly phenyl, or α- or β-naphthyl which is unsubstituted or substituted with halogen or $C_1-C_4$ alkyl. As $C_1-C_3$ alkylene, E is for example methylene, ethylene or propylene.

As $C_2-C_6$ alkylene, G is for example ethylene, propylene, 2,2-dimethylpropylene, tetramethylene or hexamethylene; and as $C_6-C_{12}$ arylene, G is o-, m- or p-phenylene, 1,4-naphthylene or 4,4'-diphenylene.

The following compounds are examples of polyalkylpiperidine light stabilisers of this class:

(63) N-hydroxymethyl-N'-2,2,6,6-tetramethylpiperidin-4-yl-urea,

(64) N-methoxymethyl-N'-2,2,6,6-tetramethylpiperidin-4-yl-urea,

(65) N-methoxymethyl-N'-n-dodecyl-N'-2,2,6,6-tetramethyl-piperidin-4-yl-urea, and

(66) O-(2,2,6,6-tetramethylpiperidin-4-yl)-N-methoxymethyl-urethane.

(f) Polymeric compounds of which the recurring structural unit contains a polyalkylpiperidine radical of the formula (I), especially polyesters, polyethers, polyamides, polyamines, polyurethanes, polyureas, polyaminotriazines, poly(meth)acrylates or poly(meth)acrylamides, and copolymers thereof which contain such radicals.

The compounds of the following formulae, wherein m is a number from 2 to about 200 inclusive, are examples of polyalkylpiperidine light stabilisers of this class.

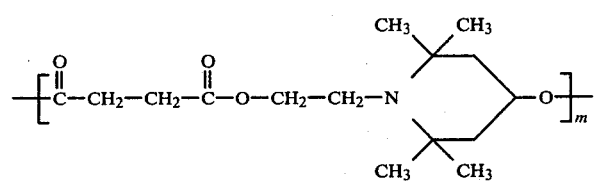
(67)

-continued
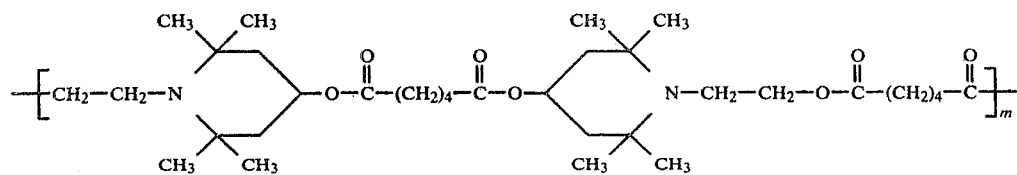
(68)
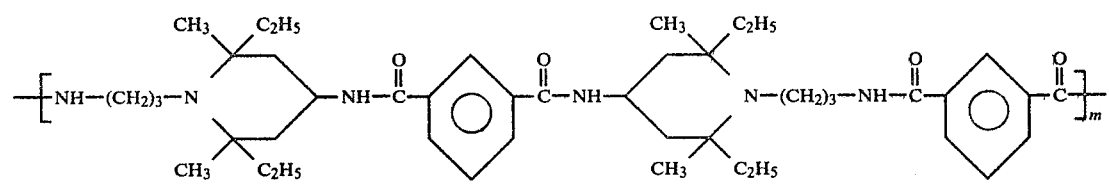
(69)
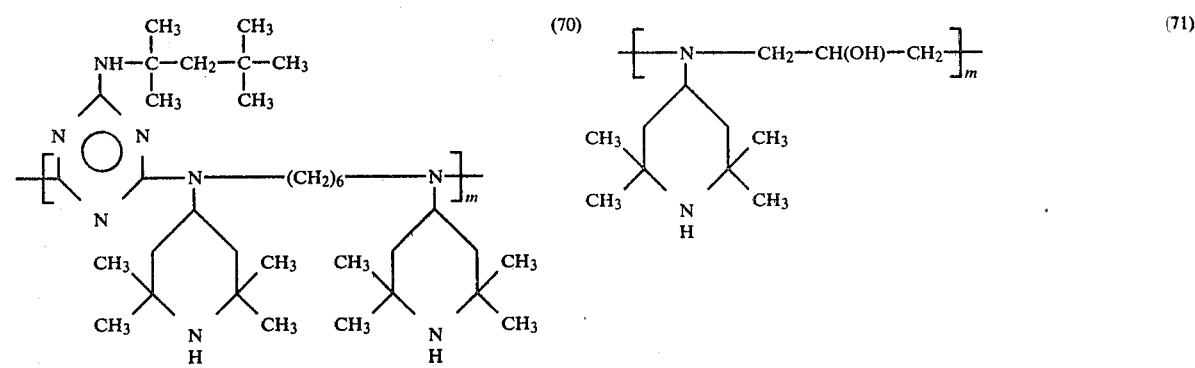
(70)
(71)
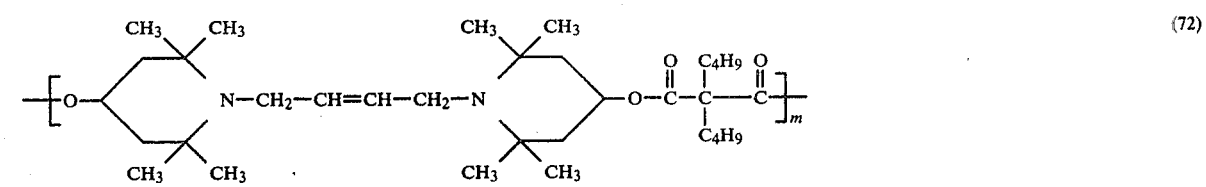
(72)
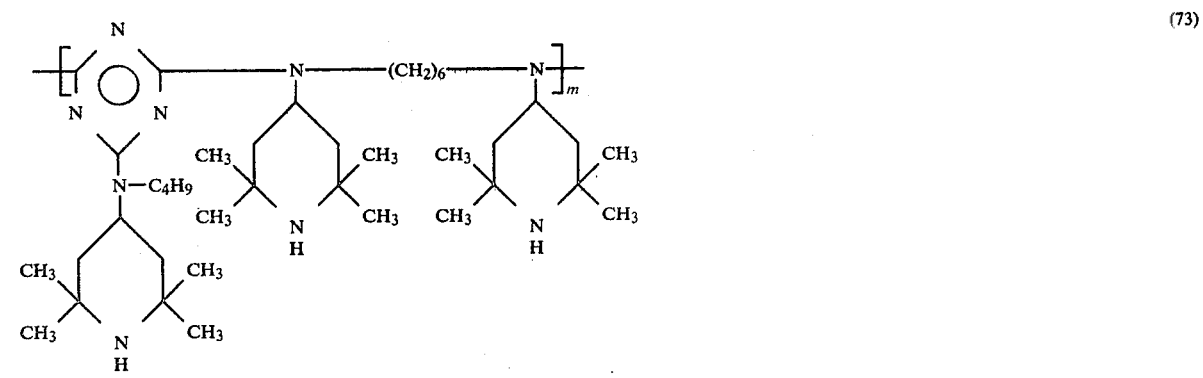
(73)
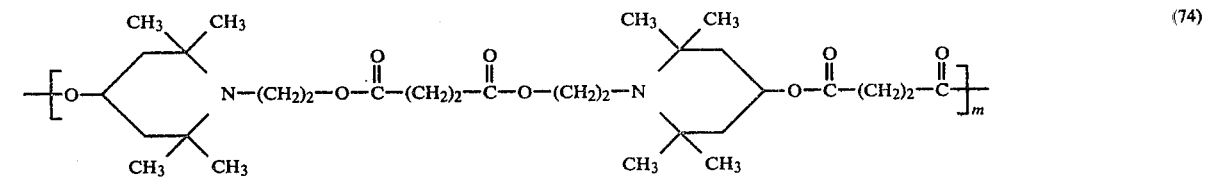
(74)

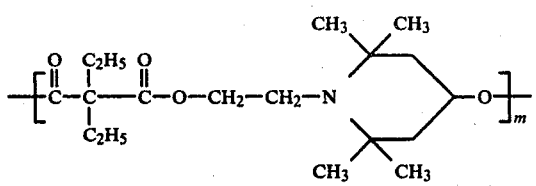   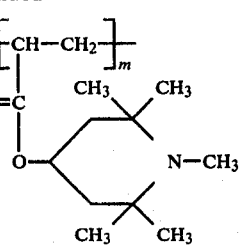

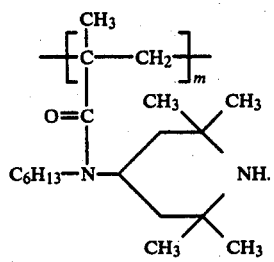

It is also possible to use polyalkylpiperidine derivatives of the classes (a)–(f) which form chemical bonds with the binder of the lacquer. This is the case when the polyalkylpiperidine derivative possesses a reactive group suitable for this purpose, for example a glycidyl group or a methylol group.

Examples of such compounds are the polyalkylpiperidine derivatives of the class (g) containing methylol or methylol ether groups.

Provided the polyalkylpiperidine derivatives are basic compounds, they can form salts with acids. Suitable acids are for example inorganic acids or organic carboxylic, sulfonic, phosphonic or phosphinic acids, such as hydrochloric acid, boric acid, phosphoric acid, acetic acid, salicylic acid toluenesulfonic acid or benzenephosphonic acid.

The polyalkylpiperidine compounds can form complexes with complex-forming metal compounds, for example with zinc-II-acetate, cobalt-II-acetylacetonate, nickel-II-acetylacetonate, aluminium-III-acetylacetonate, nickel-II-benzoate or aluminium-III-benzoylacetonate.

The acrylic resin lacquers which according to the invention can be stabilised against light, moisture and oxygen are the customary acrylic resin stoving lacquers, such as are described for example in H. Kittel's 'Lehrbuch der Lacke und Beschichtungen' (Textbook of Lacquers and Coatings), Volume 1, parts 2 on pages 735 and 742 (Berlin, 1972), and in H. Wagner, H. F. Sarx, 'Lackkunstharze' (Synthetic resins for Lacquers), on pages 229–235.

Of particular interest is the stabilisation, according to the invention, of metallic lacquers based on hot-crosslinkable polyacrylate resins which contain styrene incorporated by polymerisation. It would be possible with these resins to produce metallic lacquers having excellent physical and chemical properties if it were not for the formation of cracking on weathering, depending of the content of incorporated styrene. An outstanding stabilisation against the formation of cracking mentioned is however possible by the addition according to the invention of polyalkylpiperidine derivatives, especially in combination with a conventional light stabiliser of the UV-absorber type.

The stabilisation of metallic lacquers based on alkyd resins, in accordance with the invention, is likewise of particular interst. The stabilisation of metallic lacquers based on alkyd resin with the customary light stabilisers of the UV-absorber type is also problematic, and offers no satisfactory technical solution. It is however now possible by the addition according to the invention of light stabilisers based on polyalkylpiperidine derivatives, optionally together with other stabilisers, to fully satisfactorily stabilise also metallic lacquers based on alkyd resin against light and moisture, particularly against the formation of cracking. The alkyd resin lacquers which can be stabilised according to the invention against the action of light and moisture are the customary stoving lacquers, which are used especially for the lacquering of motor cars (so-called motor car lacquers), for example lacquers based on alkydmelamine resins and alkyd-acrylic-melamine resins.

Also metallic lacquers based on oil-free polyesters can be successfully stabilised according to the invention.

For obtaining the metallic effect, there are used the aluminium pigments normally employed for this purpose in an amount of 1 to 10 percent by weight, relative to the solvent-free binder (lacquer resin). The application of the metallic lacquers stabilised according to the invention is effected preferably, in the usual manner, by one of two processes: either by the single-layer process or by the two-layer process. In the latter case, the layer containing the aluminium pigment is firstly applied, and then over this is applied a covering clear-lacquer layer.

The amount of polyalkylpiperidine derivative added is 0.01 to 5 percent by weight, relative to the solvent-free binder, preferably 0.5 to 1 percent by weight. The lacquers can contain the customary organic solvents, or they can be dissolved or dispersed in water, or they can be free from solvent.

In the case of application in two-layer lacquering, the polyalkylpiperidine derivative to be used for stabilisation according to the invention can be incorporated either solely into the unpigmented surface lacquer, or both into the unpigmented surface lacquer and into the initially applied lacquer containing the aluminium pigment. In the production of acrylic resins or of acrylic-modified alkyd resins, polymerisable polyalkylpiperidine derivatives (for example compounds 7 and 39) can be incorporated into the resin by polymerisation.

Incorporation into the lacquer binder can however also be effected by way of polycondensation in the production process, or possibly during stoving of the melamine, alkyd or polyester resins. Examples of polyalkylpiperidine derivatives which can be incorporated by condensation are the compounds 1, 26, 27 and also 1-hydroxyethyl-4-hydroxy-2,2,6,6-tetramethylpiperidine. Incorporation by way of polyaddition can be effected for example by way of the reaction of free carboxyl groups in the acrylic resin with glycidyl groups of the polyalkylpiperidine derivative. These carboxyl groups can be incorporated by polymerisation of acrylic acid or of derivatives thereof.

In these cases, there is the additional advantage that the light stabilisers cannot be removed by extraction or migration, so that their action is retained for a very long time.

To obtain maximum stability to light, the concomitant use of other customary stabilisers can be advantageous. Examples of these are UV absorbers of the benzophenone, oxalanilide or benzotriazole type, or acrylic acid derivatives, or metal-containing light stabilisers, such as organic nickel compounds.

In the case of such combinations, the sum of all light stabilisers is 0.02 to 5 percent by weight, preferably 0.5 to 2 percent by weight, relative to the lacquer resin.

Further additives which can be contained in the lacquer are antioxidants, for example those of the sterically hindered phenol derivative type, organic phosphorus compounds, for example phosphites, phosphonites or phosphines, plasticisers, levelling agents, curing accelerators, for example organic Co, Mn or Zr salts, thickeners, dispersing agents or agent improving adhesion.

The following Examples illustrate the use according to the invention of polyalkylpiperidine derivatives in metallic lacquers based on binder systems containing alkyd resin. The term 'parts' in the Examples denotes parts by weight, and percentages are given as percent by weight.

EXAMPLES

Example 1

Light stabilisation of a two-layer metallic lacquering based on binder systems containing alkyd resin (cracking test)

Basic recipe of the lacquers

| (a) | Metallic first-coat lacquer | |
|---|---|---|
| | Alftalat VAN 21/1 (Hochst) | 13.15 parts |
| | CAB 381.01/18% in butylacetate (Eastman Chemical Corp.) | 55 parts |
| | Uresin B (Hochst) | 2.5 parts |
| | Maprenal VMF 80/15 (Hochst) | 3.45 parts |
| | Alcoa 726 (Aluminum Corp of America) | 6.5 parts |
| | 15% solution of BYK 300 (BYK Mallinckrodt) in butylacetate/xylene | 2 parts |
| | xylene | 6 parts |
| | butyl glycol | 5 parts |
| | butylacetate/xylene = 1/1 | 6.4 parts |
| (b) | Unpigmented surface lacquer (second-coat lacquer) | |
| | Alftalat AC 451 n (Hochst) | 28.5 parts |
| | Synthacryl SC 303 (Hochst) | 30.7 parts |
| | Maprenal VMF 80/15 (Hochst) | 22.8 parts |

| -continued | |
|---|---|
| butyl glycol | 4.3 parts |
| butyl glycol acetate | 1.7 parts |
| Solvesso 150 (Esso) | 8.5 parts |
| Solvesso 100 (Esso) | 3.5 parts |

The first-coat lacquer (base lacquer) was sprayed (15–20μ) onto aluminium sheet coated with a coil coat. After a short airing time, the surface lacquer (top layer) was sprayed on wet on wet with a coating thickness of 30–40μ and, after an airing time of 15 minutes, the coated sheet was stoved for 20 minutes at 135° C.

Before application, there was added to the surface lacquer the polyalkylpiperidine compound given in column 2 (numbered according to the examples mentioned in the specification) in the amount given in percent in each case in column 1 of the following Table I.

After storage for 4 weeks in an air-conditioned chamber (23° C./50% relative humidity), the lacquered sheets were weathered according to test method ASTM G-53/77 in a QUV Tester for 930 hours. The specimens in this test were in each case mentioned for 4 hours at 50° C., and irradiated for 4 hours in a moist atmosphere at 60° C. with UV light.

The evaluation of the weathered lacquer specimens was made according to the TNO cracking scale, Type 353, with the pattern of cracking being compared with standardised samples. The capital letters give the nature and form of cracking. The numbers give the intensity of cracking. Ten levels are chosen for designation of the intensity; the level of maximum intensity is always given as 10. The small letters are a measure for the depth of cracking: a denotes superficial damage to the top layer; b and c denote cracking in top layer and top and base layer, respectively; d indicates the case where the base layer is cracked but not the top layer. The respective pattern of cracking is shown in column 3 of Table I.

TABLE I

| % | Polyalkylpiperidine compound | Pattern of cracking |
|---|---|---|
| — | — | J 8 a |
| 1 | compound 1 | no crack |
| 1 | compound 3 | J 2 a |
| 1 | compound 4 | J 3 a |
| 1 | compound 11 | no crack |
| 1 | compound 19 | no crack |
| 1 | compound 20 | no crack |
| 1 | compound 67 | no crack |
| 1 | compound 70 | no crack |
| 1 | compound 75 | no crack |

Comparative test

Metallic lacquers which are bases on binder systems containing alkyd resin and which contain a UV absorber as a light stabiliser In a comparative test, the procedure was carried out exactly as described for Example 1 with the single exception that a UV absorber was used instead of the polyalkylpiperidine compound. In the following Table II, the amount of light stabiliser in percent (relative to the lacquer resin) is given in column 1; the light stabiliser used is given in column 2; and the pattern of cracking is shown in column 3.

TABLE II

| % | Light stabiliser | Pattern of cracking |
|---|---|---|
| 1 | 2-(2-hydroxy-3,5-di-tert-amyl-phenyl)-benzotriazole | J 10 b |
| 3 | 2-(2-hydroxy-3,5-di-tert-amyl-phenyl)-benzotriazole | J 9 b |
| 1 | 2-(2,4-dihydroxyphenyl)-benzotriazole | J 9 b |
| 3 | 2-(2,4-dihydroxyphenyl)-benzotriazole | J 4 a |
| 1 | 2,4-dihydroxybenzophenone | J 7 a |
| 3 | 2,4-dihydroxybenzophenone | J 2 a |
| 1 | 2-hydroxy-4-octylbenzophenone | J 8 b |
| 3 | 2-hydroxy-4-octylbenzophenone | J 7 a |
| 1 | 2-hydroxy-4-dodecylbenzophenone | J 9 b |
| 3 | 2-hydroxy-4-dodecylbenzophenone | J 9 b |
| 1 | 2-(2-hydroxy-5-isooctylphenyl)-benzotriazole | J 4 a |
| 3 | 2-(2-hydroxy-5-isooctylphenyl)-benzotriazole | J 2 a |
| 1 | 2-ethoxy-2'-ethyl-oxalanilide | J 4 b |
| 3 | 2-ethoxy-2'-ethyl-oxalanilide | J 7 b |

Example 2

Combination of polyalkylpiperidine derivative and UV absorber for stabilising a two-layer metallic lacquering based on a binder system containing alkyd resin Metallic lacquerings were produced and tested exactly as described in Example 1 with the single exception that with the polyalkylpiperidine derivative was incorporated also a UV absorber. In the following Table III, the amount of light stabiliser in percent (relative to the lacquer resin) is givn in column 1; the light stabiliser used is given in column 2; and the pattern of cracking is shown in column 3.

TABLE III

| % | Light stabiliser | Pattern of cracking |
|---|---|---|
| 0.5 | compound 1 | J 1 a |
| 0.5 | 2-(2-hydroxy-3,5-di-tert-amyl-phenyl)-benzotriazole | |
| 0.5 | compound 20 | no crack |
| 0.5 | 2-(2-hydroxy-3,5-di-tert-amyl-phenyl)-benzotriazole | |
| 0.5 | compound 67 | no crack |
| 0.5 | 2-(2-hydroxy-5-α-methyl-styryl-phenyl)-benzotriazole | |

Example 3

Combination of polyalkylpiperidine derivatives with a metal compound for stabilising a two-layer metallic lacquering based on binder systems containing alkyd resin (cracking test)

Metallic lacquerings were produced and tested exactly as described in Example 1 with the single exception that together with the polyalkylpiperidine derivative was incorporated also a metal salt. In the following Table IV, the amount of light stabiliser and of metal compound in percent (relative to the lacquer resin) is given in column 1; the light stabilisers and metal compounds used are given in column 2; and the pattern of cracking is shown in column 3.

TABLE IV

| % | Light stabiliser metal compound | Pattern of cracking |
|---|---|---|
| 0.5 | compound 11 | no crack |
| 0.2 | nickel acetylacetonate | |
| 0.5 | compound 11 | no crack |
| 0.2 | aluminium acetylacetonate | |

Example 4

A metallic lacquering was produced and tested exactly as described in Example 1 with the single exception that together with the polyalkylpiperidine derivative were incorporated both a UV absorber and a metal compound. To 0.5% of the compound 11 were added 0.5% of 2-hydroxy-3,5-di-tert-amyl-phenylbenzotriazole and 0.2% of aluminium acetylacetonate (% values are relative to the lacquer resin).

No cracking was observed after weathering.

Example 5

Light stabilisation of a two-layer metallic lacquering based on binder systems containing acrylic resin (gloss retention test)

Basic recipe for the lacquers

| (a) | Metallic first-coating lacquer | |
|---|---|---|
| | polyester resin L 1850 (Dynamit Nobel AG) | 27.0 parts |
| | melamine resin Maprenal RT (Farbwerke Hochst AG) | 3.0 parts |
| | cellulose acetobutyrate CAB 531 (Eastman Chem. Corp.) | 2.0 parts |
| | Alcoa 726 (Aluminium Corp. of America) | 8.0 parts |
| | toluene | 10.0 parts |
| | xylene | 7.0 parts |
| | butanol | 3.0 parts |
| | butylacetate | 25.0 parts |
| | armatic solvent Solvesso 150 (Ess0) | 15.0 parts |
| (b) | Unpigmented surface lacquer (second-coat lacquer) | |
| | Synthacryl SC 303 (Hochst) | 59.0 parts |
| | Maprenal MF 590 (Hochst) | 17.4 parts |
| | butyl glycol acetate | 2.0 parts |
| | Solvesso 150 (Esso) | 2.0 parts |
| | Solvesso 100 (Esso) | 2.0 parts |
| | xylene | 6.6 parts |
| | silicone oil AL/1% in xylene | 0.2 part |

A commercial primer and also a commercial intermediate filler were firstly applied to 0.4 mm thick aluminium sheet, and the specimen was then stoved. An approximately 15μ thick layer of first-coat lacquer containing the aluminium pigment was sprayed onto this lacquer foundation, and an approximately 30–40μ thick layer of unpigmented surface lacquer was subsequently applied wet-on-wet over the first-coat lacquer. After a brief airing time, the lacquers were stoved in a lacquer drying oven at 125° for 30 minutes. Two specimens were produced: the first one without any addition of stabiliser, the second one with an addition of 1% (relative to the lacquer resin) of the compound 11 in the surface lacquer. The specimen sheets obtained in this manner were then stored for four weeks under standard climatic conditions (23° C./5% relative humidity), and afterwards subjected to weathering in a QUV apparatus according to ASTM G 53-77. The attached Diagram I shows the gloss values (ASTM D 523) obtained on the stabilised specimen (O) and on the unstabilised specimen (X) plotted against the weathering time.

Example 6

Light stabilisation of a two-layer metallic lacquering based on hot-crosslinkable polyacrylate resins containing styrene incorporated by polymerisation Basic recipe of the lacquers

| (a) | Metallic first-coat lacquer | |
|---|---|---|
| | polyester resin L 1850 (Dynamit Nobel AG) | 27.0 parts |
| | melamine resin Maprenal RT (Farbwerke Hochst AG) | 3.0 parts |
| | cellulose acetobutyrate CAB 531 (Eastman Chem. Corp.) | 2.0 parts |
| | Alcoa 726 (Aluminium Corp. of America) | 8.0 parts |
| | toluene | 10.0 parts |
| | xylene | 7.0 parts |
| | butanol | 3.0 parts |
| | butylacetate | 25.0 parts |
| | aromatic solvent Solvesso 150 (Esso) | 15.0 parts |
| (b) | Unpigmented surface lacquer | |
| | commercial acrylic resin containing styrene incorporated by polymerisation (60%) | 59.0 parts |
| | Maprenal MF 590 (Hochst) | 17.4 parts |
| | butyl glycol acetate | 2.0 parts |
| | Solvesso 150 (Esso) | 2.0 parts |
| | Solvesso 100 (Esso) | 2.0 parts |
| | xylene | 6.6 parts |
| | silicone oil OL/1% in xylene | 0.2 parts |

An aluminium sheet coated with a coil coat was sprayed with the first-coat lacquer containing the aluminium pigment to give a layer thickness of about 15μ; onto this layer was then sprayed wet-on-wet the unpigmented surface lacquer to give a layer thickness of about 30–40μ. After a short airing time, the lacquers were stoved in a lacquer drying oven at 140° C. for 30 minutes. The sheets obtained were stored for 4 weeks under standard climatic conditions (23° C./50% relative humidity), and were subsequently subjected to weathering in a QUV apparatus according to ASTM G 53-77, in the manner already mentioned in Example 1.

Into the unpigmented surface lacquer, there had been incorporated beforehand the light stabilisers listed in column 2 of the following Table V in the amount give in each case in % (relative to the lacquer resin) in column 1. In column 3 of Table V is given the weathering time, and in colum 4 the pattern of cracking occurring.

TABLE V

| % | Light stabiliser | Weathering time | Pattern of cracking |
|---|---|---|---|
| — | — | 1400 h | J 10 b |
| 1 | compound 11 | 2800 h | no crack |
| 0.5 | compound 11 | 2800 h | no crack |
| 0.5 | 2-(2-hydroxy-3,5-di-tert-amyl-phenyl)-benzotriazole | | |

Comparative test

Metallic lacquers based on hot-cross-linkable polyacrylate resins containing styrene incorporated by polymerisation, stabilised with a UV absorber In a comparative test, the procedure was carried out exactly as described in the case of Example 6, with the single exception that a UV absorber was used in place of the polyalkylpiperidine compound. In the following Table VI, the amount of light stabiliser in % (relative to the lacquer resin) is given in column 1, the employed light stabiliser in column 2, the weathering time in column 3 and the pattern of cracking in column 4.

TABLE VI

| % | Light stabiliser | Weathering time | Pattern of cracking |
|---|---|---|---|
| — | — | 1400 h | J 10 b |
| 1 | 2,4-dihydroxy-benzophenone | 2800 h | J 10 a |
| 1 | 2-(2-hydroxy-3,5-di-tert-amyl-phenyl)-benzotriazole | 2800 h | J 10 a |

It is shown from Table V that with an addition of a polyalkylpiperidine compound as stabiliser there is still no cracking even with double the weathering time in the QUV apparatus, in contrast to the cracking in the specimen containing no polyalkylpiperidine compound as stabiliser. As is shown by Table VI, this surprisingly good stabilising effect was not obtained with the UV absorbers tested by way of comparison.

It can be seen from the attached Diagrams II and III that there is obtained by combination of a polyalkylpiperidine compound with a UV absorber a synergistic stabilising effect, which is manifested in a clearly better retention of gloss (determined according to ASTM D 523) and in a distictly lower loss of weight.

Example 7

Light stabilisation of a single-layer metallic lacquering based on binder systems containing acrylic resin (gloss retention test)

Basic recipe of the lacquer

| aluminium paste Mobil R superfine (Eckhart-Werke, Furth/Bay, D) | 1.29 parts |
|---|---|
| xylene (to form a slurry of the aluminium paste) | 1.29 parts |
| Synthacryl SC 300 (50% strength) (Hochst) | 59.35 parts |
| Maprenal MF 650 (55% strength) (Cassela-Hochst) | 25.22 parts |
| Polysolfan O (Hochst) | 3.97 parts |
| ethyl glycol acetate | 1.98 parts |
| xylene | 6.90 parts |

The lacquer was adjusted with 29.7 parts of a DKH synthetic resin thinner (Dr. K. Herberts, Wuppertal, D) to give a spray viscosity of 19 seconds according to DIN 53211.

A commercial primer and also a commercial intermediate filler were firstly applied to a 0.4 mm thick aluminium sheet, and the specimen was then stoved. Onto this lacquer foundation was then sprayed, in 3 cross-coatings with 15 seconds airing for each, the lacquer containing the aluminium pigment to obtain a layer thickness of about 40μ. After being exposed to the air for 20 minutes, the lacquer was stoved in a lacquer drying oven at 120° C. for 25 minutes.

Before the lacquer was applied, there was added to it the stabiliser(s) shown in column 2 of the following Table VII in the amount given in each case in column 1 in % (relative to the lacquer resin) (polyalkylpiperidine compounds numbered according to the examples mentioned in the specification). The sheets obtained were stored for four weeks under standard climatic conditions (23° C./5% relative humidity), and they were then subjected to weathering in a QUV apparatus according to ASTM G-53/77. In the following Table VII are given the gloss values (ASTM D 523) as a function of the weathering time (before weathering, after 350, 480 and 570 hours, respectively).

TABLE VII

| % Light stabiliser | | 20° gloss after weathering | | | |
|---|---|---|---|---|---|
| | | 0 h | 350 h | 480 h | 570 h |
| — | — | 70 | 25 | 19 | 17 |
| 1 | compound 3 | 76 | 64 | 57 | 47 |
| 1 | compound 11 | 75 | 60 | 55 | 52 |
| 1 | compound 19 | 75 | 63 | 51 | 48 |
| 0.5 | compound 11 | | | | |
| 0.5 | 2-(2-hydroxy-3,5-di-tert-amyl-phenyl)-benzotriazole | 75 | 60 | 59 | 59 |
| 0.5 | compound 19 | | | | |
| 0.5 | 2-(2-hydroxy-3-α-methylbenzyl-5-methyl-phenyl)-benzotriazole | 77 | 70 | 71 | 71 |

Analogous results are obtained also with the use of polyalkylpiperidine derivatives in combination with 2-(2-hydroxy-3,5-di-α,α-dimethylbenzyl-phenyl)-benzotriazole or with 2-[2-hydroxy-3,5-di-(1,1,3,3-tetramethyl-butylphenyl)-benzotriazole.

Example 8

Light stabilisers which can be incorporated by addition

Light stabilisation of a two-layer metallic lacquering with the compound A of the formula (glass retention test)

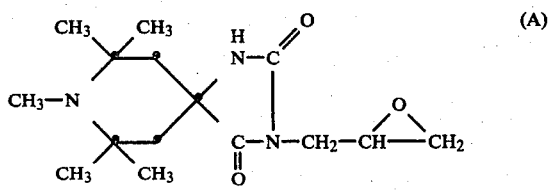

(A)

Incorporation of compound A into the unpigmented surface lacquer

Compound A was added to a commercial clear lacquer based on acrylic resin which can be cross-linked with melamine/formaldehyde resins and which contains acrylic acid besides acrylic acid esters and styrene incorporated by polymerisation, and the whole was stirred overnight at 40° C. There occured during this stage the incorporation of the light stabiliser by reaction of the glycidyl group of the light stabiliser with the acid groups in the acrylic resin. Further light stabilisers can if necessary be subsequently added (see following Table VIII, column 2).

Preparation of the test specimens

The surface lacquer produced as described above was sprayed wet-on-wet onto an aluminium sheet to which had previously been applied a commercial filler-primer and the metallic first-coat lacquer, and the specimen was then stoved at 130° C. for 30 minutes. The layer thickness of the first-coat lacquer was about 15μ, and that of the surface lacquer about 35μ.

Weathering tests

After 2 weeks' storage of the sheets under standard climatic conditions, the specimens were weathered according to test method ASTM G53-77 in a QUV Tester for 1000 hours.

To the unpigmented surface lacquer had been added the light stabilisers given in column 2 of the following Table VIII in the amounts shown in % (relative to the lacquer resin) in column 1 of the Table. The gloss of the lacquer surface was subsequently measured according to test method ASTM D 523, the values obtained being listed in column 3:

TABLE VIII

| | | 20° gloss (averaged) | |
|---|---|---|---|
| % Light stabiliser | | unweathered | after 1000 hours of weathering |
| — | — | 98 | 43 |
| 1 | compound A | 96 | 80 |
| 0.5 | compound A | 99 | 92 |
| 0.5 | 2-(2-hydroxy-3,5-di-α,α-dimethylbenzyl-phenyl)-benzotriazole | | |
| 1 | compound A | 99 | 98 |
| 1 | 2-(2-hydroxy-3,5-di-α,α-dimethylbenzyl-phenyl)-benzotriazole | | |

Example 9

Light stabilisers incorporated by polymerization

Light stabilisation of a two-layer metallic lacquering with the compound B of the formula

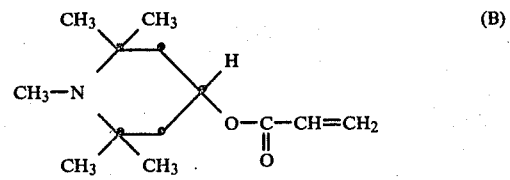

(B)

Incorporation of compound B into the unpigmented surface lacquer

The compound of the formula B was incorporated, at a concentration of about 30 percent by weight (relative to the lacquer resin), into an acrylic resin (copolymer from acrylic acid esters and styrene). In this case, the compound of the formula B was used along with other (meth)-acrylic acid esters and styrene as comonomers, with the solution being introduced into boiling xylene, and polymerisation initiated with the aid of di-tert-butylperoxide. The reaction time was about 4 hours. The acrylic resin produced in this manner was used as a stabiliser concentrate for producing the surface lacquer. For this purpose, the stabiliser concentrate, optionally together with other light stabilisers (see Table IX), was added to a commercial clear lacquer (acrylic/melamine-resin mixture).

Preparation of the test specimens

The surface lacquer produced in the manner described above was sprayed wet-on-wet onto an aluminium sheet onto which had been previously applied a commercial filler-primer and the metallic first-coat lacquer, and the speciment was stoved at 130° C. for 30 minutes. The layer thickness of the first-coat lacquer was about 15μ, and that of the surface lacquer about 35μ.

Weathering tests

After 2 weeks' storage of the sheets under standard climatic conditions, the specimens werre weathered in a Xenotest 1200 apparatus, and the time until cracking in the surface lacquer commenced was determined.

To the unpigmented surface lacquer were added the light stabilisers shown in column 2 of the following Table IX in the amounts given in each case in % (relative to the lacquer resin) in column 1. The time in hours until cracks commenced to form is shown in column 3.

TABLE IX

| % | Light stabiliser | Hours until cracks commenced to form |
|---|---|---|
| — | — | 1300 |
| 1 | 2-(2-hydroxy-3,5-di-tert-amyl-phenyl)-benzotriazole | 1600 |
| 0.5 | compound B | 1900 |
| 0.5 | 2-(2-hydroxy-3,5-di-tert-amyl-phenyl)-benzotriazole | |

I claim:

1. A method of stabilizing metallic stoving lacquers based on hot-crosslinkable alkyd resins or acrylic resins against the action of light, moisture and oxygen comprising incorporating in said alkyd resin or acrylic resin an effective stabilizing amount of a 2,2,6,6-tetraalkyl-piperidine compound, or of the acid addition salts or complexes with metal compounds thereof.

2. The method of claim 1 wherein said compound is a light stabiliser of the formula (II)

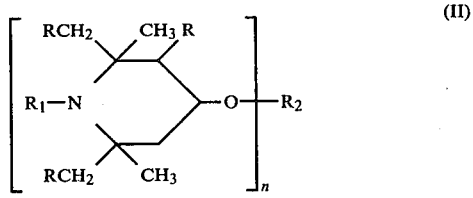

(II)

in which n is a number from 1-4 inclusive; R is hydrogen or methyl; $R_1$ is hydrogen, oxyl, $C_1$-$C_{18}$ alkyl, $C_3$-$C_8$ alkenyl, $C_1$-$C_8$ alkynyl, $C_7$-$C_{12}$ aralkyl, $C_1$-$C_8$ alkanoyl, $C_3$-$C_5$ alkenoyl, glycidyl or a group —CH$_2$—CH(OH)—Z wherein Z is hydrogen, methyl or phenyl; and $R_2$ when n is 1 is hydrogen, $C_1$-$C_{18}$ alkyl optionally interrupted by one or more oxygen atoms, cyanoethyl, benzyl, glycidyl, a monovalent radical of an aliphatic, cycloaliphatic, araliphatic or aromatic carboxylic acid, or of carbamic acid or of a phosphorus-containing acid, or a monovalent silyl radical; $R_2$ when n is 2 is $C_2$-$C_{12}$ alkylene, $C_4$-$C_{12}$ alkenylene, xylilene, a bivalent radical of an aliphatic, cycloaliphatic, araliphatic or aromatic dicarboxylic acid, of dicarbamic acid or of a phosphorus-containing acid, or a bivalent silyl radical; $R_2$ when n is 3 is a trivalent radical of an aliphatic, cycloaliphatic or aromatic tricarboxylic acid, of an aromatic tricarbamic acid or of a phosphorus-containing acid, or a trivalent silyl radical; and $R_2$ when n is 4 is a tetravalent radical of an aliphatic, cycloaliphatic or aromatic tetracarboxylic acid.

3. The method of claim 2 wherein said light stabiliser of the formula (II) in which n is the number 1 or 2; R is hydrogen or methyl; $R_1$ is hydrogen, $C_1$-$C_{12}$ alkyl, allyl, benzyl, acetyl or acryloyl; and $R_2$ when n is 1 is a radical of an aliphatic carboxylic acid having 2-18 C atoms, of a cycloaliphatic carboxylic acid having 5-12 C atoms or of an aromatic carboxylic acid having 7-15 C atoms; and $R_2$ when n is 2 is a radical of an aliphatic dicarboxylic acid having 2-36 C atoms, of a cycloaliphatic or aromatic dicarboxylic acid having 8-14 C atoms, or of an aliphatic, cycloaliphatic or aromatic dicarbamic acid having 8-14 C atoms.

4. The method of claim 1 wherein said compound is a light stabiliser of the formula (III)

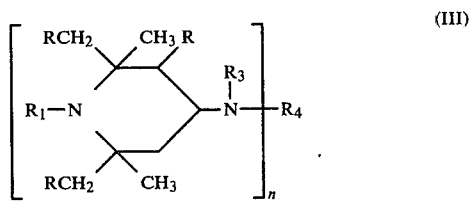

(III)

in which n is the number 1 or 2; R is hydrogen or methyl; $R_1$ is hydrogen, oxyl, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl or $C_3$-$C_5$ alkenoyl; $R_3$ is hydrogen, $C_1$-$C_{12}$ alkyl, $C_5$-$C_7$ cycloalkyl, $C_7$-$C_8$ aralkyl, $C_2$-$C_{18}$ alkanoyl, $C_3$-$C_5$ alkenoyl or benzoyl; and $R_4$ when n is 1 is hydrogen, $C_1$-$C_{18}$ alkyl, $C_5$-$C_7$ cycloalkyl, $C_2$-$C_8$ alkenyl which is unsubstituted or substituted by a cyano, carbonyl or carbamide group, or it is glycidyl, a group of the formula —CH$_2$—CH(OH)—Z or of the formula —CONH—Z wherein Z is hydrogen, methyl or phenyl; or $R_4$ when n is 2 is $C_2$-$C_{12}$ alkylene, $C_6$-$C_{12}$ arylene, xylilene, a —CH$_2$—CH(OH)—CH$_2$— group or a group —CH$_2$—CH(OH)—CH$_2$—(X—O—CH$_2$—CH(OH)—CH$_2$— wherein X is $C_2$-$C_{10}$ alkylene, $C_6$-$C_{15}$ arylene or $C_6$-$C_{12}$ cycloalkylene; or, provided that $R_3$ is not alkanoyl, alkenoyl or benzoyl, $R_4$ can also be a bivalent radical of an aliphatic, cycloaliphatic or aromatic dicarboxylic acid or dicarbamic acid, or can also be the group —CO—; or $R_3$ and $R_4$ together when n is 1 can be the cyclic radical of an aliphatic or aromatic 1,2- or 1,3-dicarboxylic acid.

5. The method of claim 1 wherein said compound is a light stabiliser of the formula (IV)

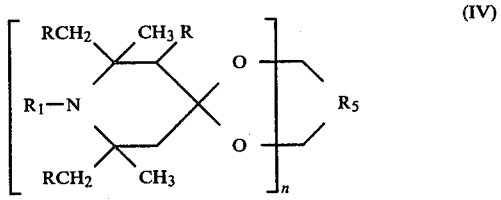

(IV)

in which n is the number 1 or 2; R is hydrogen or methyl; $R_1$ is hydrogen, oxyl, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl or $C_3$-$C_5$ alkenoyl; and $R_5$ when n is 1 is $C_2$-$C_8$ alkylene or hydroxyalkylene or $C_4$-$C_{22}$ acyloxyalkylene; and $R_5$ when n is 2 is the group (—$CH_2$)$_2$C(CH$_2$—)$_2$.

6. The method of claim 1 wherein said compound is a light stabiliser of the formula (V)

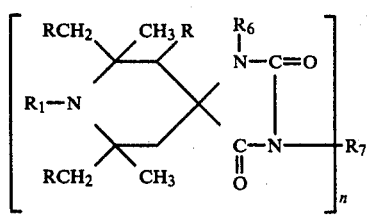

(V)

in which n is the number 1 or 2; R is hydrogen or methyl; $R_1$ is hydrogen, oxyl, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl or $C_3$-$C_5$ alkenoyl; $R_6$ is hydrogen, $C_1$-$C_{12}$ alkyl, allyl, benzyl, glycidyl or $C_2$-$C_6$ alkoxyalkyl; and $R_7$ when n is 1 is hydrogen, $C_1$-$C_{12}$ alkyl, $C_3$-$C_5$ alkenyl, $C_7$-$C_9$ aralkyl, $C_5$-$C_7$ cycloalkyl, $C_2$-$C_4$ hydroxyalkyl, $C_2$-$C_6$ alkoxyalkyl, $C_6$-$C_{10}$ aryl, glycidyl, a group of the formula —(CH$_2$)$_m$—COO—Q or of the formula —(CH$_2$)$_m$—O—CO—Q wherein m is 1 or 2, and Q is $C_1$-$C_4$ alkyl or phenyl; or $R_7$ when n is 2 is $C_2$-$C_{12}$ alkylene or $C_6$-$C_{12}$ arylene, a group —CH$_2$—CH(OH)—CH$_2$—O—X—O—CH$_2$—CH(OH)—CH$_2$— wherein X is $C_2$-$C_{10}$ alkylene, $C_6$-$C_{15}$ arylene or $C_6$-$C_{12}$ cycloalkylene, or a group —CH$_2$CH(OZ') CH$_2$—(OCH$_2$—CH(OZ')CH$_2$)$_2$— wherein Z' is hydrogen, $C_1$-$C_{18}$ alkyl, allyl, benzyl, $C_2$-$C_{12}$ alkanoyl or benzoyl.

7. The method of claim 1 wherein said compound is a light stabiliser of the formula (VI)

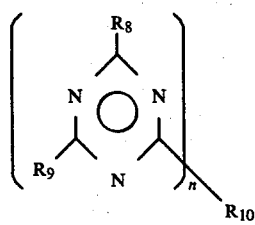

(VI)

in which n is the number 1 or 2; and $R_8$ is a group of the formula

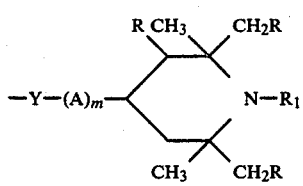

in which R is as defined under the formula (I), $R_1$ is as defined under (a), Y is —O— or —NR$_{11}$—, A is $C_2$-$C_6$ alkylene; and m is the number 0 or 1; $R_9$ is the groups $R_8$, NR$_{11}$R$_{12}$, —OR$_{13}$, —NHCH$_2$OR$_{13}$ or —N(CH$_2$OR$_{13}$)$_2$; $R_{10}$ when n is 1 is the groups $R_8$ or $R_9$; and $R_{10}$ when n is 2 is the group —Y—Q—Y— wherein Q is $C_2$-$C_6$ alkylene optionally interrupted by —N(R$_{14}$)—; $R_{11}$ is $C_1$-$C_{12}$ alkyl, cyclohexyl, benzyl or $C_1$-$C_4$ hydroxyalkyl, or a group of the formula

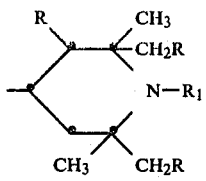

$R_{12}$ is $C_1$-$C_{12}$ alkyl, cyclohexyl, benzyl, $C_1$-$C_4$ hydroxyalkyl; $R_{13}$ is hydrogen, $C_1$-$C_{12}$ alkyl or phenyl; and $R_{14}$ is hydrogen or the group —CH$_2$OR$_{13}$; or $R_{11}$ and $R_{12}$ together are $C_4$-$C_5$ alkylene or oxaalkylene, or $R_{11}$ and $R_{12}$ are each a group of the formula

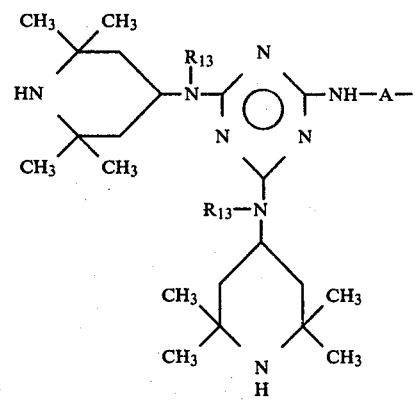

8. The method of claim 1 wherein said compound is a light stabiliser of the formula (VII)

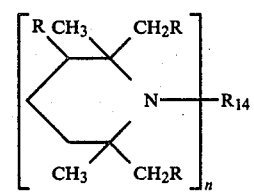

(VII)

in which n is the number 1 or 2; R is hydrogen or methyl; and $R_{14}$ when n is 1 is $C_4$-$C_{18}$ alkyl, $C_7$-$C_{12}$ aralkyl, the group —CO—R$_{15}$, or $C_1$-$C_4$ alkyl which is substituted by —CN, —COOR$_{16}$, —OH, —OCOR$_{17}$ or

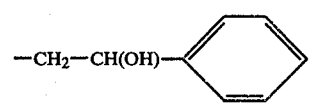

wherein $R_{15}$ is $C_1$-$C_{12}$ alkyl, $C_2$-$C_4$ alkenyl or phenyl, $R_{16}$ is $C_1$-$C_{18}$ alkyl, $R_{17}$ is $C_1$-$C_{18}$ alkyl, $C_2$-$C_{10}$ alkenyl, cyclohexyl, benzyl or $C_6$-$C_{10}$ aryl; or $R_{14}$ when n is 2 is $C_4$-$C_{12}$ alkylene, 2-butenylene-1,4, xylylene, the group —(CH$_2$)$_2$—OOC—R$_{18}$—COO—(CH$_2$)$_2$— or the group —CH$_2$—OOC—R$_{19}$—COO—CH$_2$— wherein $R_{18}$ is $C_2$-$C_{10}$ alkylene, phenylene or cyclohexylene, and $R_{19}$ is $C_2$-$C_{10}$ alkylene, xylylene or cyclohexylene.

9. The method of claim 1 wherein said compound is a light stabiliser of the formula (VIII)

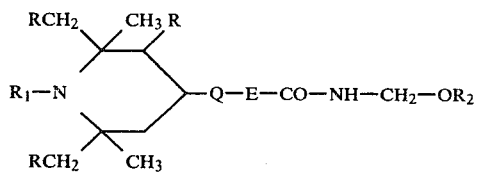

(VIII)

in which Q is $-N(R_3)-$ or $-O-$; E is $C_1-C_3$ alkylene, the group $-CH_2-CH(R_4)-O-$ wherein $R_4$ is hydrogen, methyl or phenyl, the group $-(CH_2)_3-NH-$ or a single bond; R is hydrogen or methyl; $R_1$ is hydrogen, $C_1-C_{18}$ alkyl, $C_3-C_8$ alkenyl, $C_3-C_8$ alkynyl, $C_7-C_{12}$ aralkyl, $C_1-C_8$ alkanoyl, $C_3-C_5$ alkenoyl or glycidyl; $R_2$ is hydrogen or $C_1-C_{18}$ alkyl; $R_3$ is hydrogen, $C_1-C_{18}$ alkyl, $C_5-C_7$ cycloalkyl, $C_7-C_{12}$ aralkyl, cyanoethyl, $C_6-C_{10}$ aryl, the group $-CH_2-CH(R_4)-OH$ wherein $R_4$ has the meaning defined above, a group of the formula

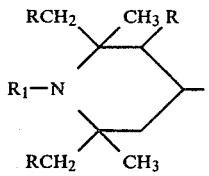

or a group of the formula

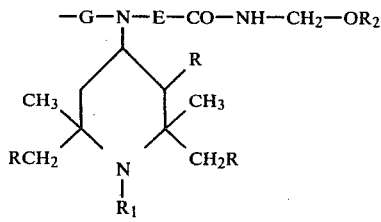

wherein G can be $C_2-C_6$ alkylene or $C_6-C_{12}$ arylene; or $R_3$ is a group $-E-CO-NH-CH_2-OR_2$.

10. The method according to claim 1, wherein additional light stabilizers are incorporated in said resins, the amount of additional stabilizer being so chosen that the sum of all the light stabilizers is 0.02 to 5 percent by weight, relative to the solvent-free binder (lacquer resin).

11. The method according to claim 10, wherein antioxidants, plasticisers, levelling agents, curing accelerators, thickeners, dispersing agents or agents improving adhesion are added as further additives.

12. The method of claim 1, wherein metallic lacquers based on binder systems containing alkyd resin are stabilised.

13. The method according to claim 1, wherein metallic lacquers based on hot-crosslinkable polyacrylate-resins containing styrene incorporated by polymerisation are stabilised.

14. The method according to claim 1, wherein said compound is (di-2,2,6,6-tetramethylpiperidin-4-yl)-sebacate.

* * * * *